United States Patent [19]

Ito et al.

[11] 4,410,384
[45] Oct. 18, 1983

[54] METHOD FOR PRODUCING CAPILLARY NIBS FOR INSCRIBING INSTRUMENTS

[75] Inventors: Akio Ito, Inazawa; Masao Ito, Nagoya, both of Japan

[73] Assignee: Pilot Man-Nen-Hitsu Kabushiki Kaisha, Tokyo, Japan

[21] Appl. No.: 171,538

[22] Filed: Jul. 23, 1980

Related U.S. Application Data

[60] Division of Ser. No. 84,304, Oct. 22, 1979, which is a continuation-in-part of Ser. No. 723,133, Sep. 14, 1976, abandoned, which is a continuation-in-part of Ser. No. 523,876, Nov. 14, 1974, abandoned.

[30] Foreign Application Priority Data

Nov. 19, 1973 [JP] Japan .................. 48-129881

[51] Int. Cl.³ .................. D04H 3/16; B43K 1/06
[52] U.S. Cl. .................. 156/167; 156/180
[58] Field of Search .......... 156/180, 441, 167, 166; 401/198, 199, 265, 292; 428/397, 398, 376; 264/176 F, 177 F

[56] References Cited

U.S. PATENT DOCUMENTS

| 3,474,703 | 10/1969 | Davis et al. | 401/198 |
| 3,558,392 | 1/1971 | Goodenow et al. | 156/296 |
| 3,586,454 | 6/1971 | Funahashi | 401/198 |
| 3,932,044 | 1/1976 | Otake et al. | 401/265 |
| 4,076,428 | 2/1978 | Otake et al. | 401/265 |

Primary Examiner—Michael W. Ball
Attorney, Agent, or Firm—Wenderoth, Lind & Ponack

[57] ABSTRACT

A capillary nib for pens is shaped from a thermoplastic resin bar and has a cross-sectional shape comprising an outer shell and a plurality of projections joined integrally at their bases to the outer shell at equal angular spacing intervals and projecting centripetally toward the center of the cross section, voids constituting principal capillary ink passages being formed between the projections, alternate projections extending fully to the center and being joined together. The thermoplastic resin bar is formed by extruding the resin in molten state though a die having a large number of orifices disposed in a specific arrangement thereby to form a plurality of filaments of the resin and causing the filaments to adhere longitudinally while the surfaces thereof are still substantially in molten state thereby to form the bar. Each passage or channel has substantially identical transverse width across its cross-sectional area.

7 Claims, 6 Drawing Figures

METHOD FOR PRODUCING CAPILLARY NIBS FOR INSCRIBING INSTRUMENTS

CROSS-REFERENCE TO RELATED APPLICATION

This is a division of application Ser. No. 87,304, filed Oct. 22, 1979, which is a continuation-in-part application of our application Ser. No. 723,133, filed Sept. 14, 1976, now abandoned, which is a continuation-in-part application of application Ser. No. 523,876, filed Nov. 14, 1974, now abandoned.

BACKGROUND OF THE INVENTION

This invention relates generally to an improved method of producing writing, drawing, marking, recording, and like inscribing instruments and more particularly to the inscribing points or nibs thereof which are of bar shape and are made of thermoplastic resins. More specifically, the invention concerns an improved method of producing nibs of this character having hollow capillary interiors.

In general, an inscribing nib in which capillarity is utilized must fulfill the following two important requirements.

The first requirement is that the nib must supply a steady outflow of ink to produce a clear and distinct inscription without discontinuities and without causing the nib tip to become scratchy.

The second requirement is that the nib must possess sufficient "ink-retaining" ability (capillarity) such that the ink drawn into the nib interior will not drip under its own weight from the outer tip of the nib.

The first of these requirements can be satisfied by so fabricating the nib that its total cavity space constituting the ink passage in the cross section of the nib (total sum of the cross-sectional areas of the plurality of spaces) will be large thereby to permit the ink to flow at an amply high rate.

The second requirement can be satisfied by making the parts of the ink passage in cross section as narrow as possible, that is, making the transverse width, or wall-to-opposite-wall dimension of the parts of the ink passage as seen in cross section as small as possible, thereby to produce high capillarity and good ink-retaining ability.

In order to obtain a nib fulfilling the above described two requirements and, moreover, having uniform inscribing performance (i.e., producing clear inscription without dripping) when any part around the circumference of the nib tip contacts the surface being inscribed, the nib is preferably so fabricated that, within limits imposed by the necessity of providing a capillarity sufficient for preventing dripping of the ink, the ink-conducting passage will afford maximum total space as viewed in cross section of the nib and will be of a pattern, or distribution, which is of uniform density over the entire cross section.

However, in the production of a nib of the instant character, certain characteristics fundamentally required of the nib, other than those described above, must also be considered. The more important of these characteristics are strength to withstand the stress imparted to the nib during inscribing, wear-resisting performance for withstanding a long period of use in inscribing, and the property of imparting a feeling of smooth gliding of the nib tip during inscribing.

Examples of nibs formed from thermoplastic resins and having the above mentioned strength, wear resistance, and smooth inscribing feel and disclosed in the specifications of U.S. Pat. Nos. 3,338,216; 3,520,629; and 3,614,247. In each of these nibs, however, the ink conducting passage is of a shape wherein a space of very small width as seen in cross section extends in the axial centerline direction of the nib. For this reason, the total area of the cross-sectional space constituting the ink-conducting passage is small, whereby an ink outflow rate which can amply keep up with the inscribing speed cannot be obtained. As a result, the nib tip tends to become scratchy, and the inscription readily becomes discontinuous. This defective operation occurs particularly in the case of nibs of diameters less than approximately 1 millimeter.

Heretofore, for the production of the marking nibs of the type under consideration, one practice has been to force a molten thermoplastic resin through an extrusion die having a plurality of orifices of the same diameter arranged in close proximity to each other. The resin emerges from the die in the form of filaments of substantially equal diameter, and while the surfaces of these filaments are still in a molten or semi-molten state, they are caused to adhere longitudinally to each other to provide an elongate bar having a plurality of ink-conducting passages or channels of capillary dimensions extending longitudinally therethrough.

According to this previous method, the cross section shapes and dimensions of the ink channels are determined by the filaments of substantially uniform diameter. Since, in practice, there are limitations upon the possible relative cross sectional arrangements of such uniform diameter filaments, the capillary action of each channel tends to become irregular in the cross sectional direction of the nib produced.

The nib of the above described character is objectionable from the standpoint of its ink-conducting ability, that is, the uniformity of ink flow through and out of the nib when in contact with a writing or marking surface. The ink retaining ability of the nib in question is also poor, so that when the instrument is brought back to a writing or marking position after having been left in an upside-down disposition, for instance, normal writing or marking cannot be effected unless the capillary channels of the nib become refilled with the ink upon elapse of a certain length of time. This is because the channels became devoid of the ink while the instrument was held in the upside-down disposition.

Thus, according to the previous method, the nibs which have channels each having constant capillarity throughout its cross-sectional area and which are futher satisfactory in the ink retaining ability can be produced only after a long trial-and-error process of finding out the optimum diameter and the optimum arrangement of extrusion orifices to be formed through a die. While the capillarity of the channels can theoretically be rendered cross sectionally constant by use of extremely fine filaments, this scheme is not quite practicable because then the extrusion die requires an inordinately large number of orifices of minute diameter.

SUMMARY OF THE INVENTION

It is an object of this invention to provide a method for producing nibs for inscribing instruments which fully fulfill the aforedescribed requirements for nibs of the character under consideration.

Another object of the invention is to provide a method for producing nibs of the above stated character which fully fulfill the requirements even when their diameters are less than approximately 1 mm.

Still another object of the invention is to provide an improved method of producing inscribing nibs in the form of extruded and longitudinally adhering filaments of thermoplastic material, such that the noted difficulties of the previous production methods are overcome in a simple and practical manner.

Another object of the invention is to provide a method of producing inscribing nibs of the above described general character, such that the nibs have favorable ink-conducting and ink retaining characteristics since each ink channel formed therethrough has substantially equal cross-sectional transverse widths throughout its cross-sectional area and this affords constant capillarity in any cross-sectional position therein.

Still another object of the invention is to provide a method of producing nibs of the character described, such that an extrusion die can be easily designed and fabricated for the production of nibs having channels of desired cross sectional shapes, dimensions, and capillary action, as well as other desired characteristics. Generally, the method will require the preliminary manufacture of trial dies only once for confirmation of the relationships between orifice diameters and extruded filament diameters.

According to this invention in one aspect thereof, briefly summarized, there is provided a method for producing a capillary nib for inscribing instruments shaped from a thermoplastic resin bar and having a cross-section shape comprising an outer shell part and a plurality of projections joined integrally at the bases thereof to the outer shell at constant angular spacing intervals and projecting centripetally toward the center of the cross section, voids constituting principal capillary ink passages being defined between the surfaces of the projections and the outer shell, a number of the projections at constant spacing intervals extending fully to the center and being joined together, the thermoplastic resin bar being formed by extruding the resin in molten state though a die having a large number of orifices disposed in a specific arrangement thereby to form a plurality of filaments of the resin and causing the filaments to adhere longitudinally while the surfaces thereof are still substantially in molten state thereby to form the bar.

According to this invention in another aspect thereof, briefly summarized, there is provided in a method of producing a bar-like capillary nib for inscribing instruments comprising the steps of: extruding a molten, thermoplastic material to form a plurality of filaments of said thermoplastic material; and adhering said extruded filaments longitudinally to each other before their surfaces are completely solidified to form a plurality of randomly spaced fluid channels of capillary dimensions longitudinally between said filaments; the improvement comprising: extruding said molten, thermoplastic material through a plurality of orifices in an extrusion die, said orifices varying in diameter and specifically arranged for positioning the extruded filaments relative to each other to form each fluid channel having substantially identical transverse widths across its cross-sectional area when said filaments are adhered together, whereby a nib bar is produced having substantially constant capillarity at any cross-sectional point in each fluid channel.

The nature, utility, and further features of the invention will be more clearly apparent from the following detailed description, beginning with a consideration of general aspects of the invention and concluding with specific examples of practice constituting preferred embodiments of the invention to be read in conjunction with the accompanying drawings, briefly described below.

DETAILED DESCRIPTION OF THE INVENTION

Figure 1:
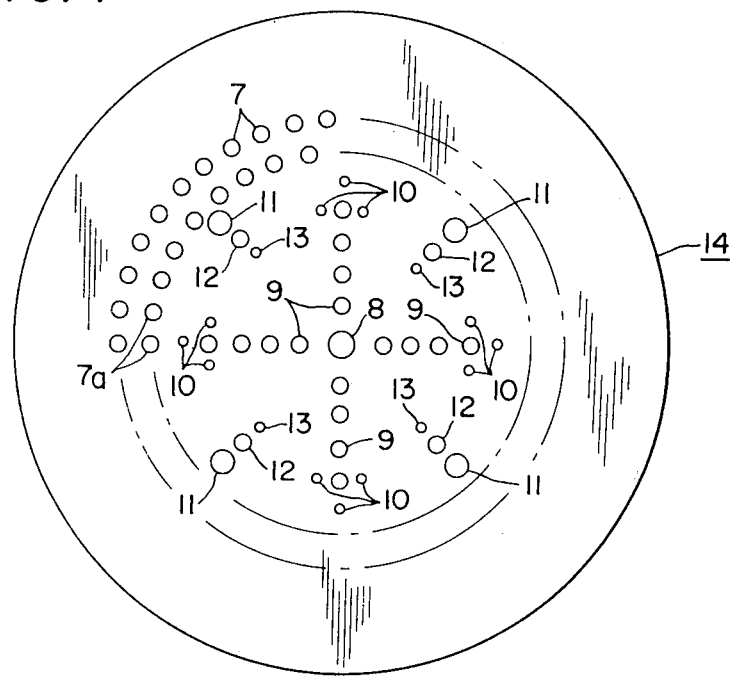
FIGS. 1, 3, and 5 are greatly enlarged plan views respectively of different examples of extrusion dies for use in producing thermoplastic resin bars from which capillary nibs of the invention are shaped.

As described hereinbefore, one practice for the production of the nibs of the type under consideration has been to force a molten thermoplastic resin through an extrusion die having a plurality of orifices arranged in close proximity to each other. The resin emerges from the die in the form of filaments, and while the surfaces of these filaments are still in a molten or semi-molten state, they are caused to adhere longitudinally to each other to provide an elongate bar having a plurality of spaced apart ink-conducting passages or channels of capillary dimensions extending longitudinally of the bar.

As a result of our research including the fabrication and studying of various nibs of different cross-sectional shapes by the above described method, we have arrived at the conclusion that a nib for fulfilling the aforedescribed requirements must have a cross-sectional shape which is fundamentally of the character described hereinbelow.

In general, this cross-sectional shape is a solid figure comprising an annular part forming the outer cylindrical shell of the nib and a plurality of projections joined at their root parts integrally with the annular part and projecting centripetally, or inwardly, therefrom at even spacing intervals, the projections constituting a systematically uniform pattern to form mutually therebetween one or more spaces to become ink conducting passages. These projections may be made in an infinite variety of shapes, although they should be of the same shape, or of the same combination of shapes, in any one nib. For fulfilling the aforedescribed requirements, these projections must not occupy an excessive portion of the cross-sectional area of the nib and, moreover, must form ink conducting passages as mentioned above which, throughout the cross section, have substantially constant and capillary-sized transverse width or distance from one passage wall to the opposite wall.

In some cases wherein the above described desirable pattern of the ink conducting passages cannot be conveniently obtained with only inwardly projecting projections, lateral projections or "branches" can be formed to project at angles from the primary projections similarly as in the structure of a tree. If necessary, even tertiary projections may be formed to project from the lateral projections. The total number of the primary projections is of the order of 5 to 18, preferably 5, 6, 8, 9, 10, or 12.

At least one filament is disposed along the centerline of the nib and the inner tips of the projections projecting furthest inward from the annular part are joined to the filament thereby to produce a bridged structure. Such a structure affords high strength and wear resistance of the nib, which are requirements to be fulfilled as mentioned hereinbefore.

According to the invention, an extrusion die with orifices of at least two different cross-sectional dimensions or diameters is used for extruding filaments of thermoplastic material for the purpose of fabricating nibs of the cross-section of the above described nature. While some specific examples of the diameters and arrangement of the orifices are shown hereinafter, the general principle of determining the arrangement and diameters of the orifices is as follows.

As will readily be understood, each capillary fluid channel in the produced bar is defined by some number of extruded filaments adhered together to surround the channel. The general cross-sectional shape of each channel to be formed is predetermined by suitably arranging the orifices in the extrusion die. Further, the determination of the dimensions of each channel is carried out by varying the diameters of the filaments defining each channel. It is to be noted that unless the intended cross-sectional shape of each channel is circular it has a number of transverse widths thereacross throughout its cross-sectional area and that each transverse width is determined by oppositely facing filaments. Thus, according to this invention, the arrangement and diameter of each orifice is determined with consideration of the transverse widths of the channel which will be influenced by them.

More specifically, if it is considered that a transverse width of a channel to be formed will become too great if a filament influencing the transverse width is of the same diameter as the other filaments defining other transverse widths, the diameter of the orifice for extruding the above filament therethrough is predetermined to be larger than the diameter of the orifices for the other filaments. Conversely, if it is considered that a transverse width of a channel will become too small if a filament influencing the width is of the same diameter as the other filaments, the diameter of the orifice for extruding the filament is predetermined to be smaller than the diameter of the orifices for the other filaments. Further, if it is considered that a transverse width of a channel will become too great an additional orifice or orifices of a suitable diameter are provided to form an extruded filament or filaments which will narrow the too great width to the amount substantially equal to the other transverse widths of the channel.

It will be understood that according to the above stated procedure it is possible to form in the produced bar fluid channels each having substantially identical transverse widths across its cross-sectional area, whereby the bar has substantially constant capillarity at any cross-sectional point in each fluid channel.

In order to indicate more fully the nature and utility of this invention, the following specific examples of practice constituting preferred embodiments of the invention are set forth, it being understood that these examples are presented as illustrative only and are not intended to limit the scope of the invention.

EXAMPLE I

An extrusion die 14 as shown in FIG. 1 was prepared with orifices of five different diameters formed therethrough. As will be seen from this figure, forty-two orifices 7 with a diameter of 0.35 millimeter are arranged with their centers on an outside circle at constant spacing intervals, with a distance of 3.60 millimeters between the outside circle and the axis of the extrusion die 14 of cylindrical or disc-like shape. Thirty-five other orifices 7a of the same diameter are likewise arranged at constant spacing intervals with their centers on an inner circle disposed internally of, and in concentric relationship to, the outside circle.

These thrity-five internally arranged orifices 7a are each spaced radially 0.25 millimeter from the adjacent one of the forty-two externally arranged orifices 7.

An orifice 8 with a diameter of 0.4 millimeter is located at the center of the extrusion die 14. Within the circle represented by the thirty-five internally arranged orifices 7a, a total of sixteen orifices 9 with a diameter of 0.38 millimeter are arranged in four radial rows generally in the form of a cross. Each orifice 9 is constantly spaced 0.15 millimeter from the adjacent orifices 9 or from the orifice 8. The outermost ones of the orifices 9 are each surrounded by three orifices 10 with a diameter of 0.3 millimeter, each orifice 10 being spaced 0.05 millimeter from the adjacent outermost orifice 9.

Furthermore, four orifices 11 with a diameter of 0.4 millimeter, four orifices 12 with a diameter of 0.35 millimeter, and four orifices 13 with a diameter of 0.26 millimeter are arranged in four radial rows within the circle represented by the thrity-five internally arranged orifices 7a. Each of the radial rows consists of three orifices 11, 12 and 13 of different diameters which are located closer to the die axis in the order of their reference numerals. It will be observed that the four radial rows represented by these orifices 11 to 13 are angularly displaced 45 degrees from the aforementioned four radial rows represented by the orifices 9. The orifices 11 to 13 of each row are arranged at constant spacings of 0.05 millimeter, and the outermost orifices 11 are also spaced 0.05 millimeter from the adjacent orifices 7a.

Figure 2:
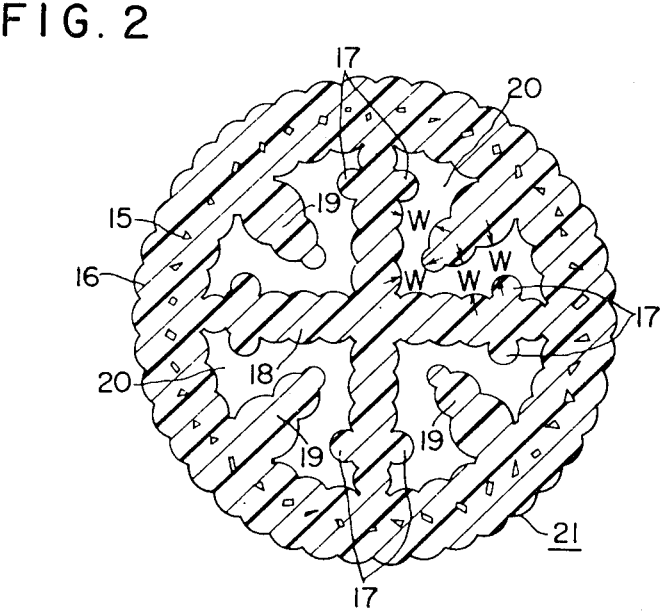
FIGS. 2, 4, and 6 are greatly enlarged cross-sectional views showing bars formed after extrusion of a thermoplastic resin through the extrusion dies shown in FIGS. 1, 3, and 5, respectively.

The extrusion die 14, having a total of 119 orifices with the five different diameters, was then fitted in the cylinder of an extruder (not shown). A molten polyacetal resin at a temperature of 180° C. was extruded through the die 14 at an extrusion rate of three grams per minute and a takeup speed of thirty meters per minute. The filaments of the polyacetal resin extruded from the die were caused to adhere longitudinally to each other while their surfaces were still in a molten or semi-molten state, thereby providing a continuous bar 21 shown in cross-section in FIG. 2.

The bar 21 has an outer diameter of about 0.8 millimeter and includes an outer cylindrical shell 16 with a width or thickness of about 0.12 millimeter and having an annular row of extremely fine ink channels 15 extending longitudinally therethrough. Within the outer shell 16 there is formed a portion 18 of cruciate cross section with an average width of about 0.08 millimeter, and each limb of this cruciate portion 18 has a pair of lateral projections 17 with a width of about 0.05 millimeter. Each limb of the cruciate portion 18 constitutes a primary projection joined at its root part integrally with the cylindrical shell and projecting centripetally or inwardly, and the four primary projections are joined together through a filament disposed along the centerline of the nib, thus forming the cruciate formation. The lateral projections 17 form lateral or secondary projections. There are further formed four substantially identical primary projections 19 projecting radially inwardly from those points of the outer shell 16 intermediate between its points of connection to the cruciate portion 18, respectively. The width of each radially inwardly projecting projection 19 diminishes substantially stepwise toward the longitudinal centerline axis of the bar 21, from about 0.10 through 0.06 to 0.04 millimeter. Thus, four substantially identical ink channels 20 of substantially uniform transverse widths w at all parts thereof are formed longitudinally through the bar 21.

This bar 21 was cut into pieces of suitable length. Each of these pieces was ground to a sharp point at one end to become its forward or writing end and used as a pen point or nib in an inscribing instrument of known construction. Each of these nibs has a void area or ink passage space which was 24 percent of the total cross-sectional area. When these nibs were used for marking in marking pens, they exhibited good ink flowout performance without dry scratching of the tip or discontinuity of the marking inscription due to insufficient ink supply. Furthermore, these nibs had good ink retentivity, wherein ink did not drip from their tips. These nibs also exhibited high wear resistance, amply withstanding marking operation of over 1,200 meters.

EXAMPLE II

Figure 3:
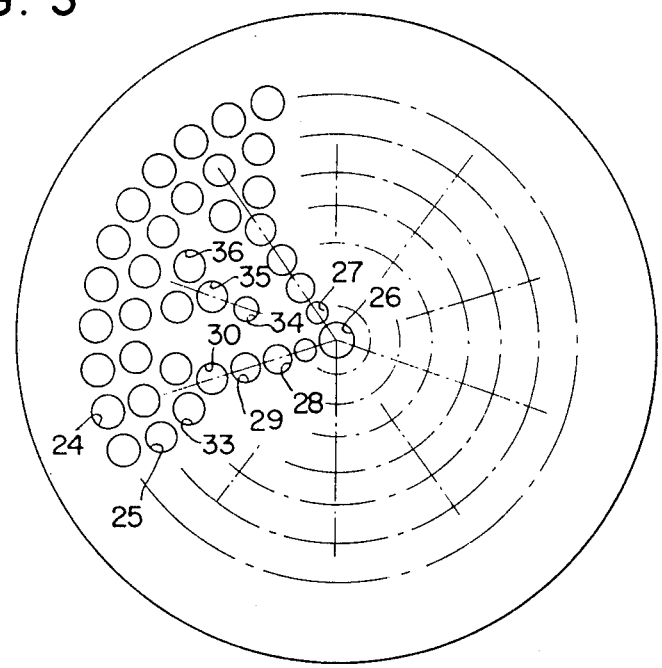

A die of the character shown in FIG. 3 was used to extrude a bar for nibs according to the invention. The diameters and dispositions of the orifices of this die are as follows.

Thirty-six orifices 24 of 0.24-mm diameter are disposed with their centers at constant spacing intervals on and around a circle having as its center the center of the die and having a radius of 3.25 mm. Thirty orifices 25 of 0.41-mm diameter are disposed with their centers at constant spacing intervals on and around a circle of 2.75-mm radius which is concentric with the first mentioned circle. An orifice 26 of 0.40-mm diameter is provided at the center of the die. On each of five lines radiating from the die center and spaced at equal angular intervals, the following four orifices 27, 28, 29, and 30 are provided. These orifices 27, 28, 29, and 30 are respectively of 0.30-mm, 0.37-mm, and 0.39-mm diameters and are disposed at points respectively at 0.43 mm, 0.86 mm, 1.30 mm, and 1.78 mm from the center of the die.

On a circle of a radius of 2.25 mm about the die center, a total of ten orifices 33 of 0.39-mm diameter are provided, a pair of these orifices 33 being disposed with a distance of 0.55 mm therebetween to straddle each of the above mentioned five equally-spaced radial lines. On each of five additional lines radiating from the die center to respectively bisect the angles between adjacent pairs of the first mentioned five radial lines, orifices 34 and 35 respectively of 0.33-mm and 0.43-mm diameters are disposed respectively at points 1.3 mm and 1.78 mm from the die center. On the above mentioned circle of 2.25-mm radius, a total of ten orifices 36 of 0.36-mm diameter are provided, a pair of these orifices 36 being disposed with a distance of 0.48 mm therebetween to straddle each of the above mentioned radial lines on which the orifices 34 and 35 are disposed.

Thus, a total of one hundred seventeen (117) orifices are formed in the die.

This die was mounted on the end of the cylinder of an extrusion forming machine (not shown) and used to extrude a polyacetal resin, which had been heated to 180° C. and thus rendered into molten state, at a rate of 20 grams per minute thereby to form filaments respectively through the above the described orifices. These filaments were caused to contact and fuse with each other in a state wherein their surfaces still had fusibility thereby to form a fused bar structure which was continuously taken up at a speed of 30 meters per minute.

Figure 4:
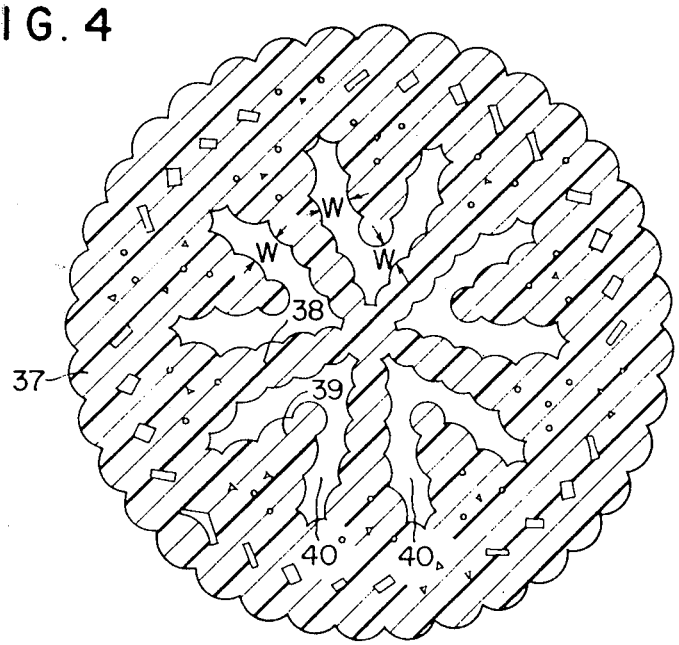

The cross section of the continuous bar thus formed was of a shape as shown in FIG. 4. This continuous bar, which has an outer diameter of 1.0 mm, has an outer annular shell 37 of a width of approximately 1.9 mm. From this outer shell 37, ten longer and shorter projections 38 and 39 extend centripetally inward toward the center and are alternately interposed at equal angular spacing intervals. Of these projections, the five projections 39 do not reach the center, but the five projections 38 are joined at their inner ends to a filament disposed at the center of the bar. As a result, a space 40 of substantially Vee shape of a transverse width of approximately 0.04 mm is formed between each projection 39 and the adjacent projections 38 on opposite sides thereof. Thus, a total of five Vee-shaped spaces 40 are formed and constitute principal ink passages of the nib bar. The total area of the ink passage spaces is approximately 15 percent of the total cross-sectional area of the bar.

The bar thus formed continuously was cut into pieces of suitable length. Each piece was sharpened at its inscribing end and used as the nib of a marking pen. When used for marking, these nibs exhibited excellent performance, their ink flow-out characteristic being good without dry scratching of the nib tip or discontinuity of marking line, and their ink retentivity being good, whereby there was not dripping of ink from the nib tip. The wear resistance of these nibs was good, the nibs being amply capable of withstanding marking over 1,200 to 1,500 meters.

EXAMPLE III

Figure 5:
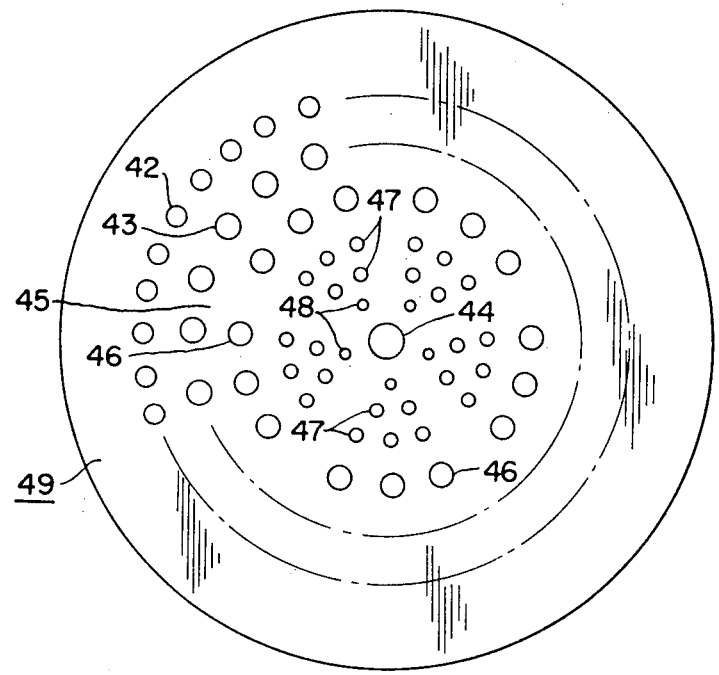

Still another extrusion die 49 having orifices of six different diameters therethrough was prepared as shown in FIG. 5. As illustrated, thirty-six orifices 42 with a diameter of 0.35 millimeter were arranged at constant spacing intervals in a circle around the center of the extrusion die 49 of cylindircal or disc-like shape, with a distance of 3.05 millimeters between the die axis and the center of each orifice 42. Twenty-two orifices 43 with a diameter of 0.40 millimeter were also arranged at constant spacing intervals in a circle around the die center, the orifices 43 being located internally of the orifices 42, with a distance of 2.5 millimeters between the die axis and the center of each orifice 43.

An orifice 44 with a diameter of 0.45 millimeter was located at the center of the extrusion die 49. Within the circle bounded by the twenty-two annularly arranged orifices 43 there were provided fifteen orifices 46 with a diameter of 0.38 millimeter, twenty-five orifices 47 with a diameter of 0.3 millimeter, and five orifices 48 with a diameter of 0.26 millimeter, in addition to the orifice 44 located at the die center.

In order to facilitate the description of the arrangement of the orifices 46, 47, and 48, it may be stated that the aforesaid circle bounded by the orifices 43 were divided into five equal sectors, set off by relatively wide radial spacings indicated by the numeral 45. Arranged within each of the five equal sectors were an arcuate row of three orifices 46, an arcuate row of three orifices 47, an arcuate row of other two orifices 47, and a single orifice 48, which were located closer to the die axis in the order mentioned. There was a distance of 2.0 millimeters between the die axis and the center of each orifice 46, and there were spacings of from about 0.10 to 0.25 millimeter between the adjacent ones of the orifices 46, 47 and 48.

Figure 6:
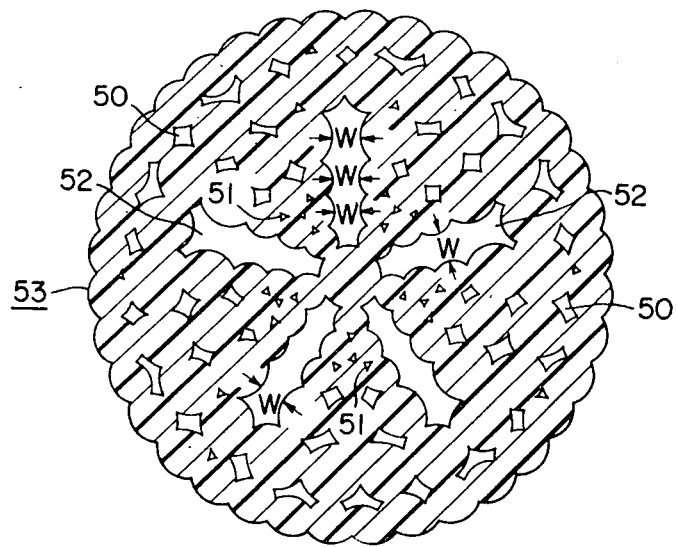

The above described extrusion die 49, having a total of 104 orifices with the six different diameters, was fitted in the cylinder of an extruder not shown. A molten polyacetal resin at a temperature of 180° C. was then extruded through the die 49, at an extrusion rate of 16 grams per minute and a takeup speed of 30 meters per minute. The polyacetal resin filaments emerging from the die 49 were caused to adhere longitudinally to each other while their surfaces were still in a molten or semi-molten state, thereby providing a continuous bar 53 represented in cross section in FIG. 6.

This bar 53 had an external diameter of about one millimeter and had a number of minute ink channels 50 and 51 of two appreciably different cross sectional sizes arranged substantially throughout the complete cross section of the bar. In addition, five relatively large, substantially identical ink channels 52 were formed in radial cross sectional arrangement, each channel 52 having a cross sectional radial length of about 0.3 millimeter and a uniform transverse width w of about 0.07 millimeter.

Also in this example, each of the ink channels 52 is formed between adjacent projections extending inwardly or centripetally from the cylindrical shell, and the tip ends of these projections are joined by a filament disposed along the centerline of the nib.

The bar was cut into a suitable length for use as a nib of a writing or marking instrument of known construction. This nib also exhibited excellent ink conducting and ink retaining characteristics.

What is claimed is:

1. A method of producing a bar-like capillary nib for use in an inscribing instrument, said method comprising the setps of:
    extruding a molten, thermoplastic material through a plurality of orifices in an extrusion die and thereby forming a plurality of filaments of said thermoplastic material;
    adhering said filaments longitudinally to each other before their surfaces are completely solidified to form a plurality of regularly spaced fluid channels of capillary dimensions extending longitudinally between said filaments;
    providing said orifices of varying diameter and arranging said orifices such that said filaments, upon being extruded and adhered together, are positioned relative to each other to form each said fluid channel to extend continuously throughout the length of the nib and to have a substantially constant width across its transverse cross-sectional area, thereby producing a nib having substantially constant capillarity at any cross-sectional position in each said fluid channel; and
    arranging said orifices such that said filaments, upon being extruded and adhered together, are positioned to form a transverse cross-sectional configuration including an outer shell portion formed of mutually adhered filaments, and a total of eight projections formed of mutually adhered filaments, said projections being integrally joined at respective bases thereof to said outer shell portion at equal angularly spaced intervals, said projections extending centripetally toward the axial center of the cross-section, four of said projections at equal angularly spaced intervals extending fully to said center and being joined thereat, thereby to form a cross-shaped figure, with each limb of said cross-shaped figure having two lateral projections extending from opposite lateral sides thereof, and said fluid channels being between said projections.

2. A method as claimed in claim 1, wherein said orifices are arranged such that the remaining four projections of said eight projections extend radially inwardly from those points of said outer shell intermediate between the points of connection therewith of said limbs of said cross-shaped figure toward said cross-shaped figure, and the width of each of said remaining four projection diminishes substantially stepwise toward said center.

3. A method as claimed in claim 2, wherein said orifices are arranged such that said lateral projections are disposed adjacent to said outer shell portion.

4. A method of producing a bar-like capillary nib for use in an inscribing instrument, said method comprising the steps of:
    extruding a molten thermoplastic material through a plurality of orifices in an extrusion die and thereby forming a plurality of filaments of said thermoplastic material;
    adhering said filaments longitudinally to each other before their surfaces are completely solidified to form a plurality of regularly spaced fluid channels of capillary dimensions extending longitudinally between said filaments;
    providing said orifices of varying diameter and arranging said orifices such that said filaments which surround and define each said fluid channel, upon being extruded and adhered together, are positioned relative to each other in such a manner that some of said filaments, which, if they were of the same diameter as the other of said filaments, would define transverse widths of the respective said fluid channel larger or smaller than the transverse widths defined by said other filaments, are respectively larger or smaller in diameter than said other filaments, thereby to form each said fluid channel to extend continuously throughout the length of the nib and to have a substantially constant width across its transverse cross-sectional area, thereby producing a nib bar having substantially constant capillarity at any cross-sectional position in each said fluid channel; and
    arranging said orifices such that said filaments, upon being extruded and adhered together, are positioned to form a transverse cross-sectional configuration including an outer shell portion formed of mutually adhered filaments, and a total of eight projections formed of mutually adhered filaments, said projections being integrally joined at respective bases thereof to said outer shell portion at equal angularly spaced intervals, said projections extending centripetally toward the axial center of the cross-section, four of said projections at equal angularly spaced intervals extending fully to said center and being joined thereat, thereby to form a cross-shaped figure, with each limb of said cross-shaped figure having two lateral projections extending from opposite lateral sides thereof, and said fluid channels being between said projections.

5. A method as claimed in claim 4, wherein said orifices are arranged such that said filaments, upon being extruded and adhered together, are positioned in such a manner that a portion of said filaments are additionally provided to form the transverse widths of the respective said fluid channels substantially smaller than if said portion were not provided.

6. A method as claimed in claim 4, wherein said orifices are arranged such that the remaining four projections of said eight projections extend radially inwardly from those points of said outer shell intermediate between the points of connection therewith of said limbs of said cross-shaped figure toward said cross-shaped figure, and the width of each of said remaining four projection diminishes substantially stepwise toward said center.

7. A method as claimed in claim 6, wherein said orifices are arranged such that said lateral projections are disposed adjacent to said outer shell portion.

* * * * *